United States Patent
Taira

(12) 
(10) Patent No.: US 6,402,966 B1
(45) Date of Patent: Jun. 11, 2002

(54) METHOD AND APPARATUS FOR PROCESSING BIOLOGICALLY HARDLY DEGRADABLE WASTE WATER CAPABLE OF REDUCING OZONE

(75) Inventor: Tsutomu Taira, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/709,183

(22) Filed: Nov. 9, 2000

(30) Foreign Application Priority Data

Nov. 10, 1999  (JP) ............................................ 11-320374

(51) Int. Cl.⁷ ................................................. C02F 1/78
(52) U.S. Cl. ........................ 210/760; 210/765; 210/766; 210/908; 210/909
(58) Field of Search ................................. 210/758, 760, 210/765, 766, 908, 909

(56) References Cited

U.S. PATENT DOCUMENTS 4,792,407 A * 12/1988 Zeff et al.
5,849,201 A * 12/1998 Bradley
6,245,242 B1 * 6/2001 Schuster et al.

* cited by examiner

*Primary Examiner*—Betsey Morrison Hoey

(57) ABSTRACT

In a method for processing a biologically hardly degradable waste water including benzene ring materials, the waste water is oxidized by using ozone to produce oxalic acid. Then, the oxalic acid is reacted using a chemical reaction to produce oxalate. Finally, the oxalate is separated out from the waste water.

7 Claims, 8 Drawing Sheets

METHOD AND APPARATUS FOR PROCESSING BIOLOGICALLY HARDLY DEGRADABLE WASTE WATER CAPABLE OF REDUCING OZONE

BACKGROUND OF THE INVENTION

1. Field of the Invention

The present invention relates to a method and apparatus for processing biologically hardly degradable waste water including benzene ring materials.

2. Description of the Related Art

Generally, organic waste water is processed by a biological process to remove organic materials from the waste water. In this case, if the organic waste water includes biologically hardly degradable materials such as benzene ring materials, the hardly degradable materials are changed into biologically easily degradable materials before the biological process.

In a first prior art method for processing biologically hardly degradable materials, the materials are oxidized by an oxidizer such as sodium hypochlorite.

In a second prior art method for processing biologically hardly degradable materials (see JP-A-8-192175), the materials are irradiated with ultraviolet rays to produce hydroxyl radical.

In a third prior art method for processing biologically hardly degradable materials (see JP-A-9-103787), the materials with a supporting electrolyte added are electrolyzed by DC.

In a fourth prior art method for processing biologically hardly degradable materials (see JP-A-6-126288), the materials are oxidized by using ozone.

In the above-mentioned prior art methods, the fourth prior art method is most effective for processing a large amount of waste water.

In the fourth prior art method, however, various kinds of oxidation processes may occur simultaneously due to less selectivity of ozone in such oxidation processes, which would consume a large amount of ozone. This will be explained later in detail.

SUMMARY OF THE INVENTION

It is an object of the present invention to provide a method and apparatus for processing a biologically hardly degradable waste water including benzene ring materials capable of reducing an amount of consumed ozone.

According to the present invention, in a method for processing a biologically hardly degradable waste water including benzene ring materials, the waste water is oxidized by using ozone to produce oxalic acid. Then, the oxalic acid is reacted using a chemical reaction to produce oxalate. Finally, the oxalate is separated out from the waste water.

Also, in an apparatus for processing a biologically hardly degradable waste water including benzene ring materials, an oxidation cell is provided for oxidizing the waste water using ozone to produce oxalic acid. A chemical reaction cell is connected to the oxidation cell to react the oxalic acid using a chemical reaction to produce oxalate. A separation cell is connected to the chemical reaction cell to separate out the oxalate from the waste water.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art method and apparatus for processing organic waste water will be explained with reference to FIGS. 1 and 2 (see JP-A6-126288).

Figure 1:
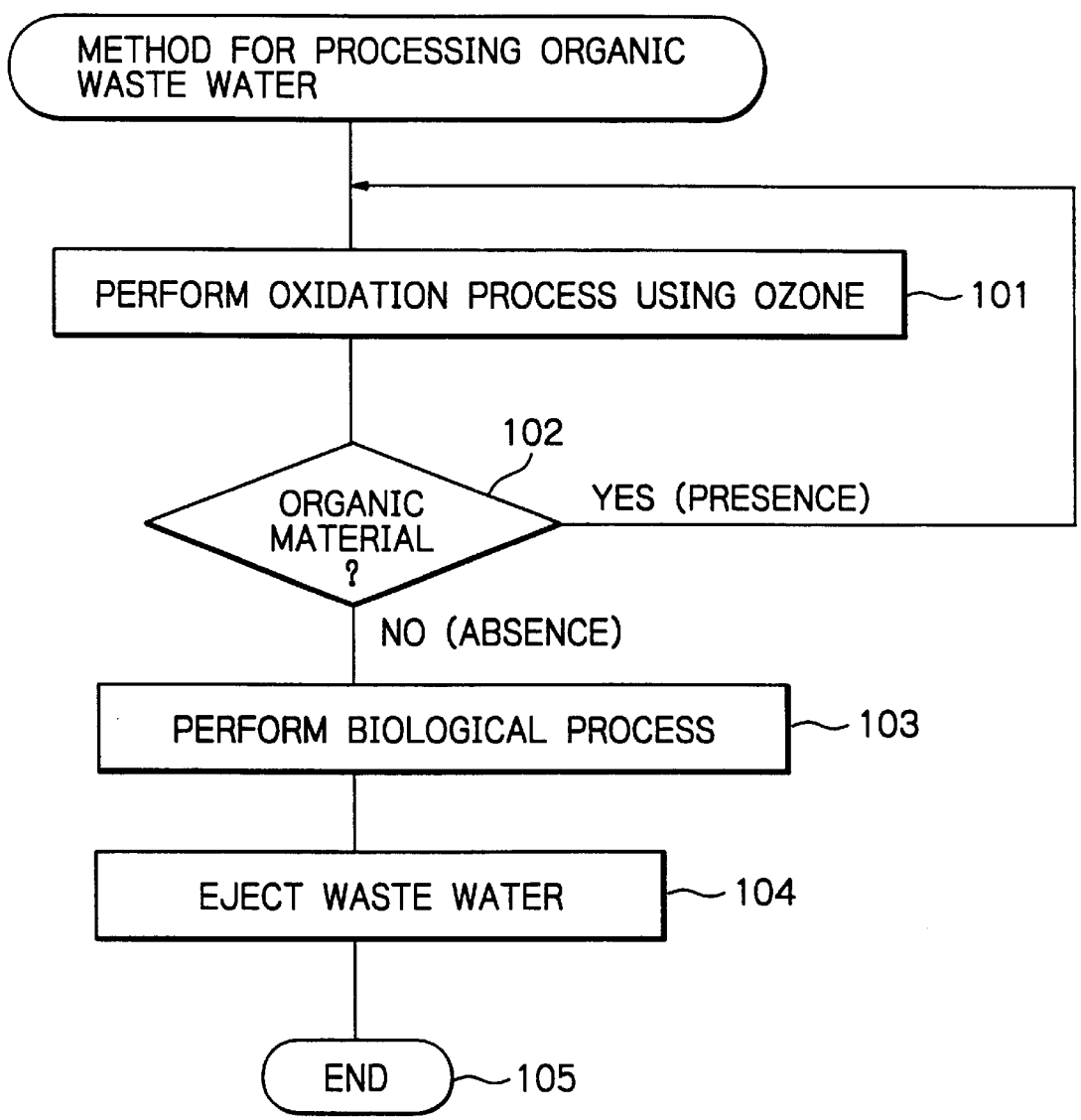
FIG. 1 is a flowchart for explaining a prior art method for processing organic waste water.

In FIG. 1, which is a flowchart for explaining a prior art method for processing organic waste water, waste water including biologically hardly degradable material formed by benzene ring material such as a phenolic hydroxyl group is processed.

First, at step 101, an oxidation process using ozone is performed upon the waste water. As a result, the waste water is oxidized.

Next, at step 102, it is determined whether or not benzene ring material still remains in the oxidized waste water. As a result, if benzene ring material remains, the control proceeds to step 101 which continues the oxidation process using ozone. On the other hand, if no benzene ring material remains, the control proceeds to step 103.

At step 103, a biological process is performed upon the waste water including no benzene ring material. As a result, the biological oxygen demands (BOD) value or the chemical oxygen demands (COD) value becomes lower than a predetermined value.

Next, at step 104, the waste water is ejected, thus completing the flowchart of FIG. 1 at step 105.

Figure 2:
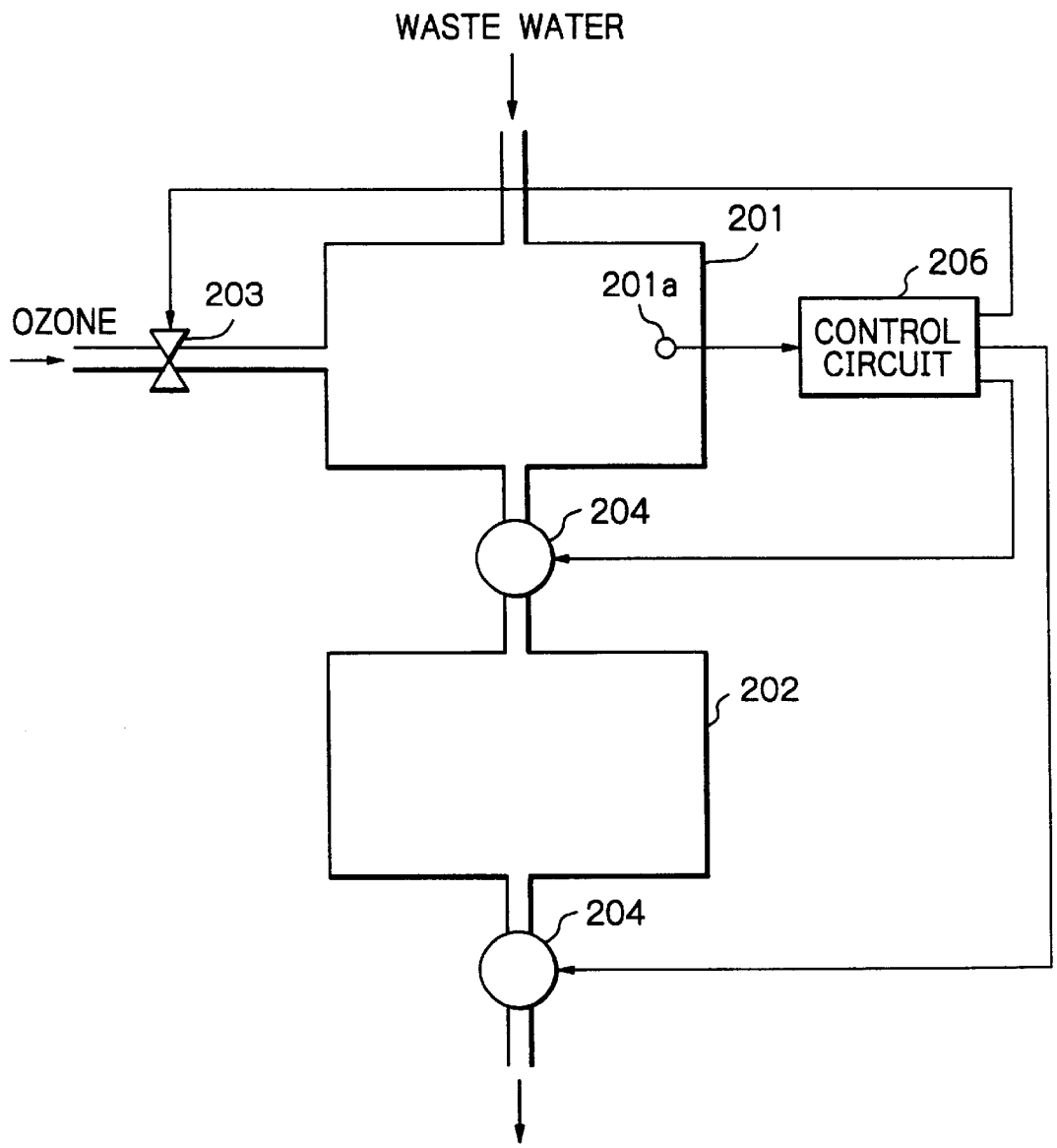
FIG. 2 is a diagram illustrating an organic waste water processing apparatus for carrying out the method as illustrated in FIG. 1.

In FIG. 2, which illustrates a waste water processing apparatus for carrying out the method as illustrated in FIG. 1, reference numeral 201 designates an oxidation cell, and 202 designates a biological processing cell. The oxidation cell 201 is supplied with ozone via a valve 203. Also, a valve 204 is provided between the oxidation cell 201 and the biological processing cell 202. Further, a valve 205 is connected at an outlet of the biological processing cell 202.

The valves 203, 204 and 205 are controlled by a control circuit 206 which is connected to an organic material sensor 201a provided within the oxidation cell 201.

The operation of the apparatus of FIG. 2 is explained below.

When waste water is supplied to the oxidation cell 201, the control circuit 206 opens the valve 203, so that an oxidation process using ozone is performed upon the waste water in the oxidation cell 201. As a result, the waste water is oxidized. In this state, the control circuit 206 determines whether or not benzene ring material still remains in the oxidized waste water in accordance with the output signal of the organic material sensor 201a. When no benzene ring material remains, the control circuit 206 closes the valve 203, and then, opens the valve 204. As a result, the waste water is moved from the oxidation cell 201 to the biological processing cell 202 by a motor (not shown) or the like.

Then, a biological process is performed upon the waste water including no benzene ring material in the biological processing cell 202. As a result, when the BOD value or the COD value becomes lower than a predetermined value, the control circuit 206 opens the valve 205, so that the waste water is ejected by a motor (not shown) or the like.

In the method and apparatus as illustrated in FIGS. 1 and 2, however, various kinds of oxidation processes may occur simultaneously due to less selectivity of ozone in such oxidation processes, which would consume a large amount of ozone. That is, benzene ring material is chemically changed by an oxidation process into oxalic acid. Also, oxalic acid is chemically-changed by an oxidation process into formic acid. Further, formic acid is chemically-changed by an oxidation process into carbonic acid. Note that the total ozone required for the latter two oxidation processes is much larger than the total ozone required for the former oxidation process.

A first embodiment of the method for processing organic waste water according to the present invention will be explained next with reference to FIG. 3.

First, at step 301, an oxidation process using ozone is performed upon waste water. As a result, the waste water is oxidized. In this case, although benzene rings are oxidized and opened so as to produce oxalic acid, the production speed is relatively low. Thus, the waste water may consist of unoxidized benzene ring material and oxalic acid.

Next, at step 302, ammonium salt(such as ammonium chloride) or ammonia and calcium salt such as calcium hydroxide are added to the waste water. As a result, oxalic acid is chemically-changed by ammonium salt or ammonia into ammonium oxalate, and then, ammonium oxalate is chemically-changed by calcium salt into calcium oxalate which is separated out. Thus, the waste water may consist of unoxidized benzene ring material and unreacted oxalic acid.

Next, at step 303, the waste water is heated to a temperature higher than about 95° C., so that unreacted oxalic acid is chemically-changed into oxalic amid which is separated out. Simultaneously, excess of ammonia included in the waste water is gasfied, and the excess of ammonia is fed back to the ammonium salt and calcium salt supplying step 302 to reuse it.

Next, at step 304, it is determined whether or not an amount of deposit formed by calcium oxalate and oxalic amid is larger than a predetermined value. As a result, if the amount of deposit is larger than the predetermined value, which means that the amount of unoxidized benzene ring material is still large, the control proceeds via a deposit removing step 309 to step 301, which repeats the operation of steps 302 through 304. On the other hand, if the amount of deposit is not larger than the predetermined value, which means that the amount of unoxidized benzene ring material is small or negligible, the control proceeds to step 305.

At step 305, the deposit is removed by a centrifugal separator or the like.

At step 306, a biological process is performed upon the waste water including no benzene ring material. As a result, the BOD value or the COD value becomes lower than a predetermined value.

Figure 3:
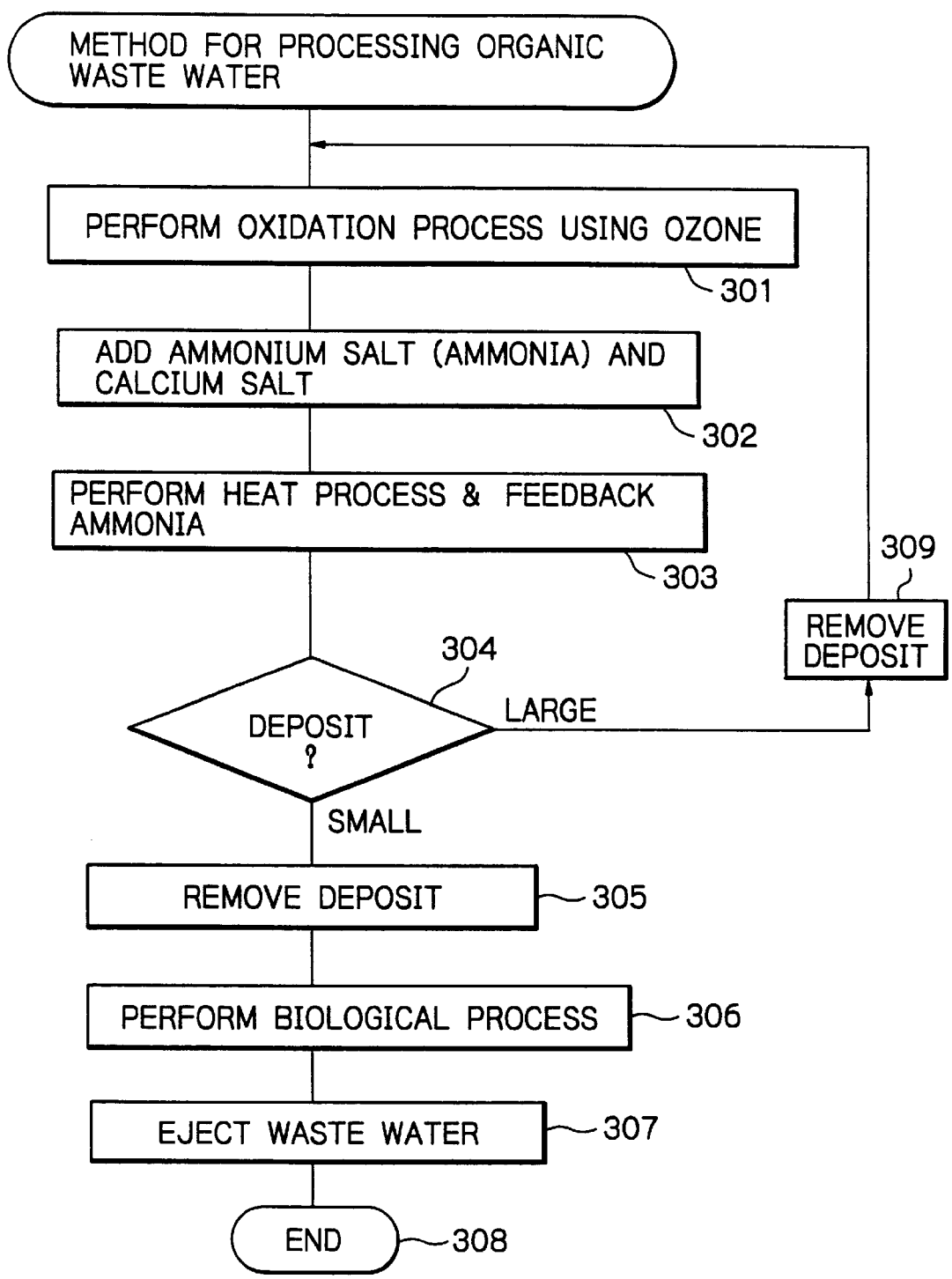
FIG. 3 is a flowchart for explaining a first embodiment of the method for processing organic waste water according to the present invention.

Next, at step 307, the waste water is ejected, thus completing the flowchart of FIG. 3 at step 308.

Note that the operation of the deposit removing step 309 is the same as that of step 305.

In the first embodiment, since no ozone is required for processing oxalic acid, the amount of consumed ozone can be reduced.

Figure 4:
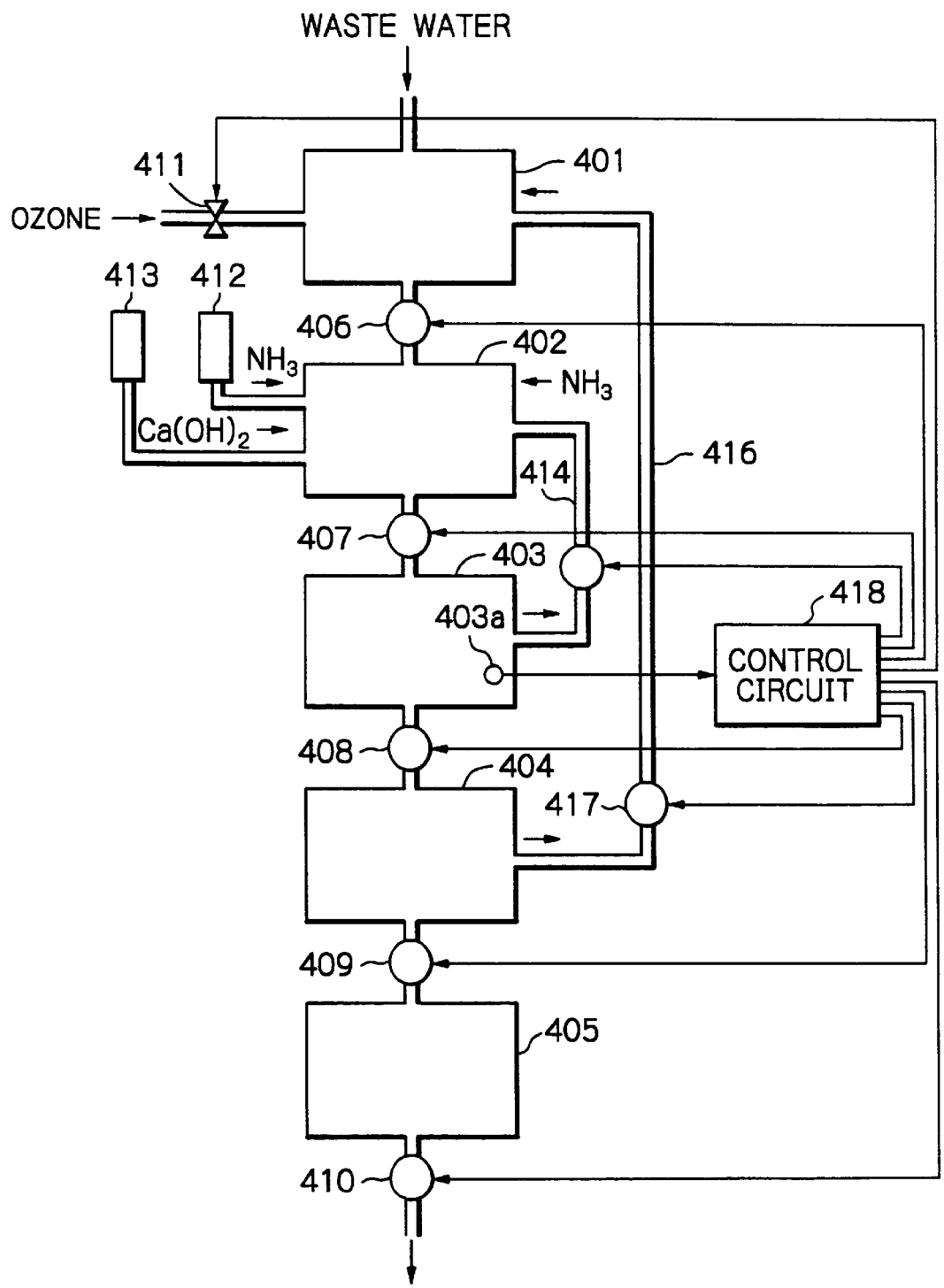
FIG. 4 is a diagram illustrating an organic waste water processing apparatus for carrying out the method as illustrated in FIG. 3.

In FIG. 4, which illustrates a waste water processing apparatus for carrying out the method as illustrated in FIG. 3, reference numeral 401 designates an oxidation cell, 402 designates a chemical reaction cell, 403 designates a heating cell, 404 designates a separation cell, and 405 designates a biological processing cell. Valves 406, 407, 408 and 409 are provided among the cells 401 through 405, and a valve 410 is connected at an outlet of the biological processing cell 405. The oxidation cell 401 is supplied with ozone via a valve 411.

Also, an ammonia source 412 and a calcium hydroxide source 413 are connected to the chemical reaction cell 402. Note that, if ammonium salt such as ammonium chloride is used, an ammonium salt source is provided instead of the ammonia source 412.

Also, an ammonia feedback pipe 414 is connected between the heating cell 403 and the chemical reaction cell 402 via a valve 415.

Further, a waste water feedback pipe 416 is connected between the separation cell 404 and the oxidation cell 401 via a valve 417.

The valves 406 through 411, 415 and 417 are controlled by a control circuit 418 which is connected to a deposit sensor 403a provided within the heating cell 403.

The operation of the apparatus of FIG. 4 is explained below.

When waste water is supplied to the oxidation cell 401, the control circuit 418 opens the valve 411 while closing the valve 406, so that an oxidation process using ozone is performed upon waste water in the oxidation cell 401. As a result, the waste water is oxidized. In this case, although benzene rings are oxidized and opened so as to produce oxalic acid, the production speed is relatively low. Thus, the waste water in the oxidation cell 401 may consist of unoxidized benzene ring material and oxalic acid.

Next, the control circuit 418 closes the valve 411, and then, opens the valve 406 while closing the valve 407. As a result, the waste water is moved from the oxidation cell 401 to the chemical reaction cell 402, where ammonia and calcium salt such as calcium hydroxide are added to the waste water. As a result, oxalic acid is chemically-changed by ammonia into ammonium oxalate, and then, ammonium oxalate is chemically-changed by calcium salt into calcium oxalate which is separated out. Thus, the waste water of the chemical reaction cell 402 may consist of unoxidized benzene ring material and unreacted oxalic acid.

Next, the control circuit 418 opens the valve 407 while closing the valve 408. As a result, the waste water is moved from the chemical reaction cell 402 to the heating cell 403, where the waste water is heated, so that unreacted oxalic acid is chemically-changed into oxalic amid which is separated out. Simultaneously, the control circuit 41 opens the valve 415 so that excess of ammonia included in the waste water is gasfied, and the excess of ammonia is fed back via the feedback pipe 415 to the chemical reaction cell 402 to reuse it.

Next, the control circuit 418 determines whether or not an amount of deposit formed by calcium oxalate and oxalic amid is larger than a predetermined value. As a result, if the amount of deposit is larger than the predetermined value, which means that the amount of unoxidized benzene ring material is still large, the control circuit 418 opens the valves 408 and 417 while closing the valve 409. As a result, the waste water is moved from the heating Cell 403 to the separation cell 404, where the deposit is removed by a centrifugal separator or the like. Then, the waste water is fed back to the oxidation cell 401 via the feedback pipe 416.

On the other hand, if the amount of deposit is not larger than the predetermined value, which means that the amount of unoxidized benzene ring material is small, the control circuit 418 opens the valve 408 while closing the valves 409 and 417. Even in this case, the waste water is moved from the heating cell 403 to the separation cell 404, where the deposit is removed by a centrifugal separator or the like. Then, the control circuit 417 opens the valve 409 while closing the valve 410. As a result, the waste water is moved from the separation cell 404 to the biological processing cell 405, where a biological process is performed upon the waste water including no benzene ring material. As a result, the BOD value or the COD value becomes lower than a predetermined value.

Next, the control circuit 418 opens the valve 410, so that the waste water is ejected.

Figure 5:
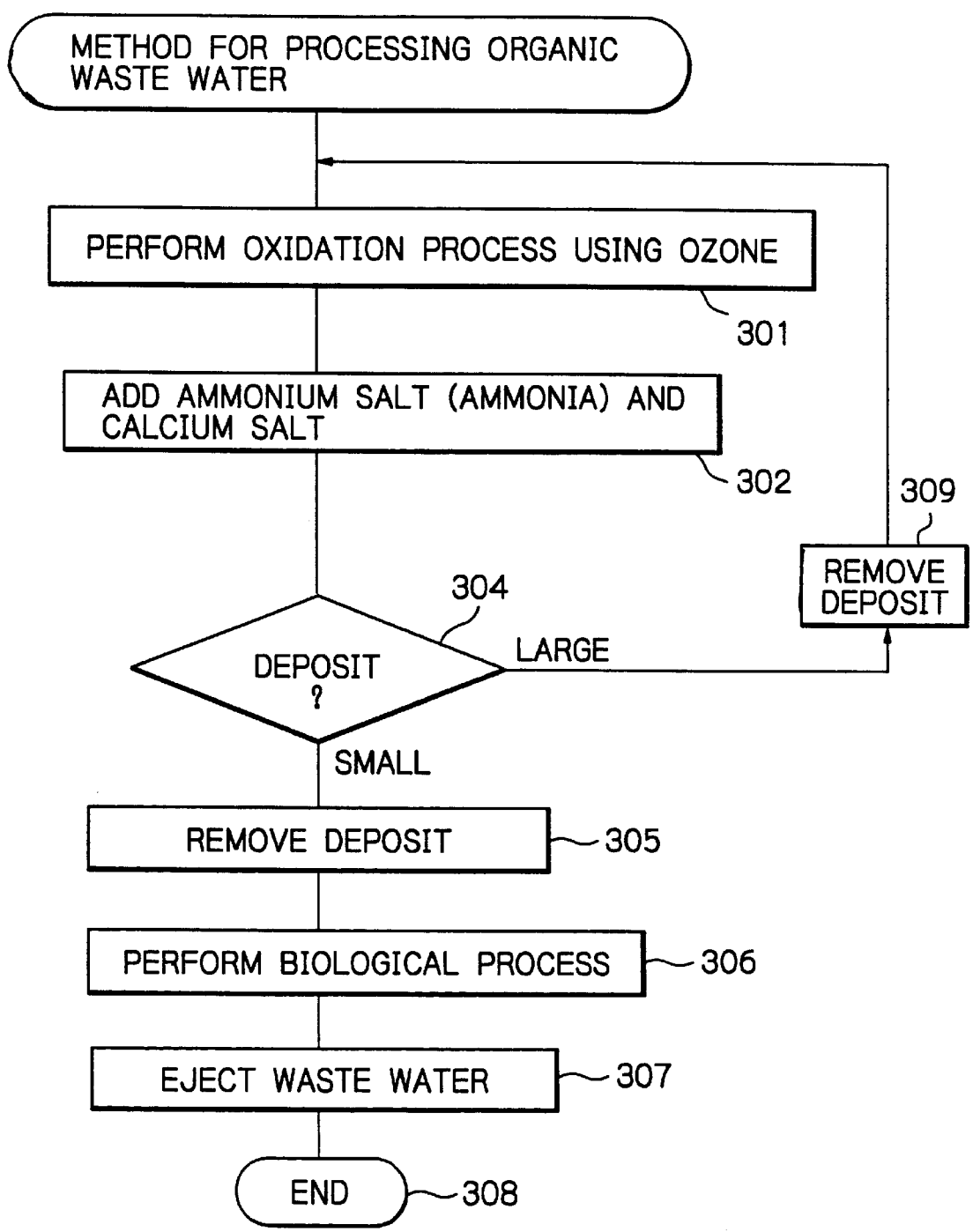
FIG. 5 is a flowchart for explaining a second embodiment of the method for processing organic waste water according to the present invention.

In FIG. 5, which illustrates a second embodiment of the method for processing organic waste water according to the present invention, step 303 of FIG. 3 is omitted. Therefore, the waste water is not heated, so that unreacted oxalic acid is not chemically-changed into oxalic amid. Thus, no oxalic amid is produced. In addition, since excess of ammonia included in the waste water is not gasfied, and the excess ammonia is not reused.

Also, at step 304, it is determined whether or not an amount of deposit formed by only calcium oxalate is larger than a predetermined value.

Figure 6:
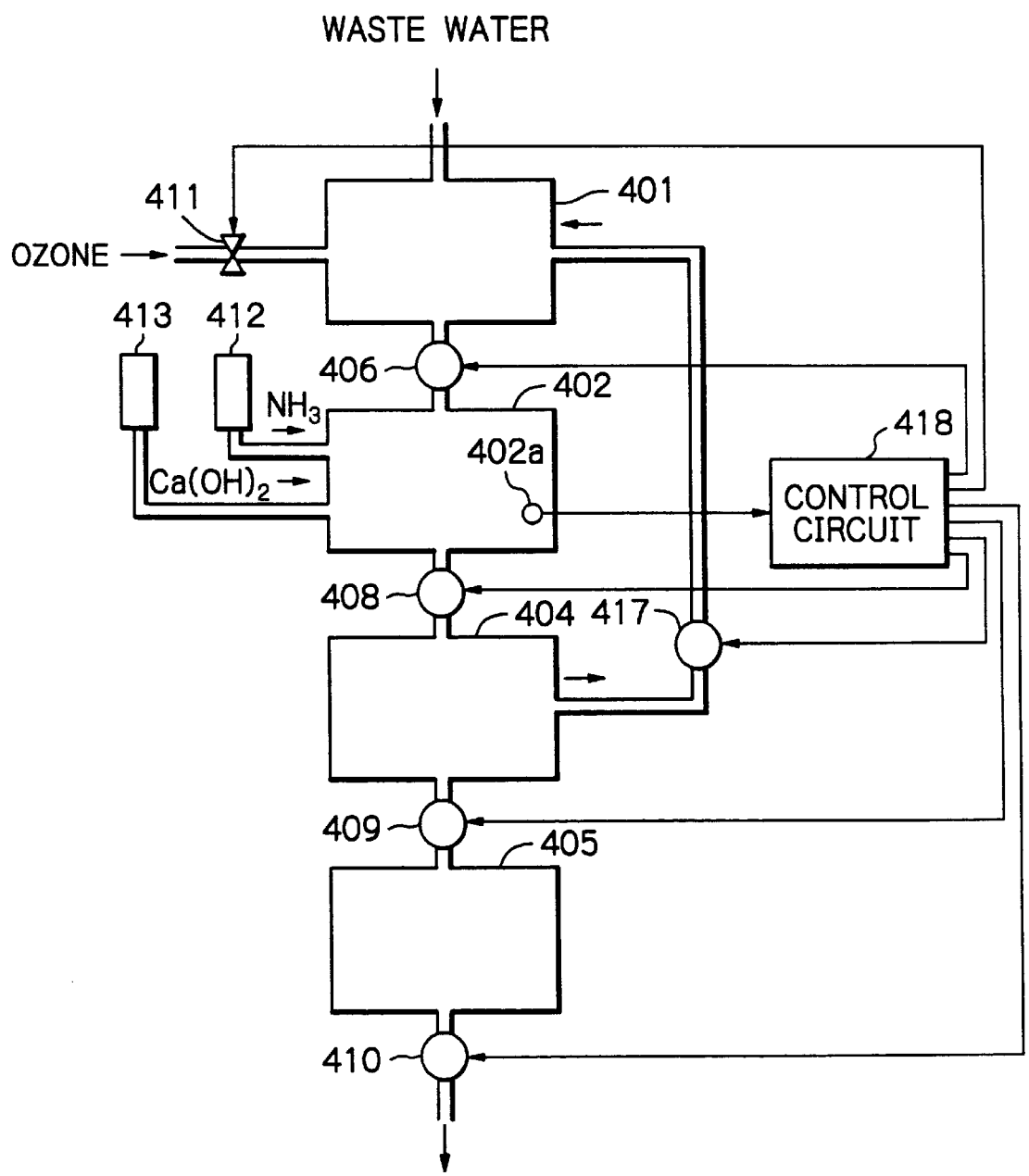
FIG. 6 is a diagram illustrating an organic waste water processing apparatus for carrying out the method as illustrated in FIG. 5.

In FIG. 6, which illustrates a waste water processing apparatus for carrying out the method as illustrated in FIG. 5, the heating cell 403, the valve 407, the feedback pipe 414 and the valve 415 of FIG. 4 are not provided, and a deposit sensor 402a instead of the deposit sensor 403a is provided with the chemical reaction cell 402.

Even in the second embodiment, since no ozone is required for processing oxalic acid, the amount of consumed ozone can be reduced.

Figure 7:
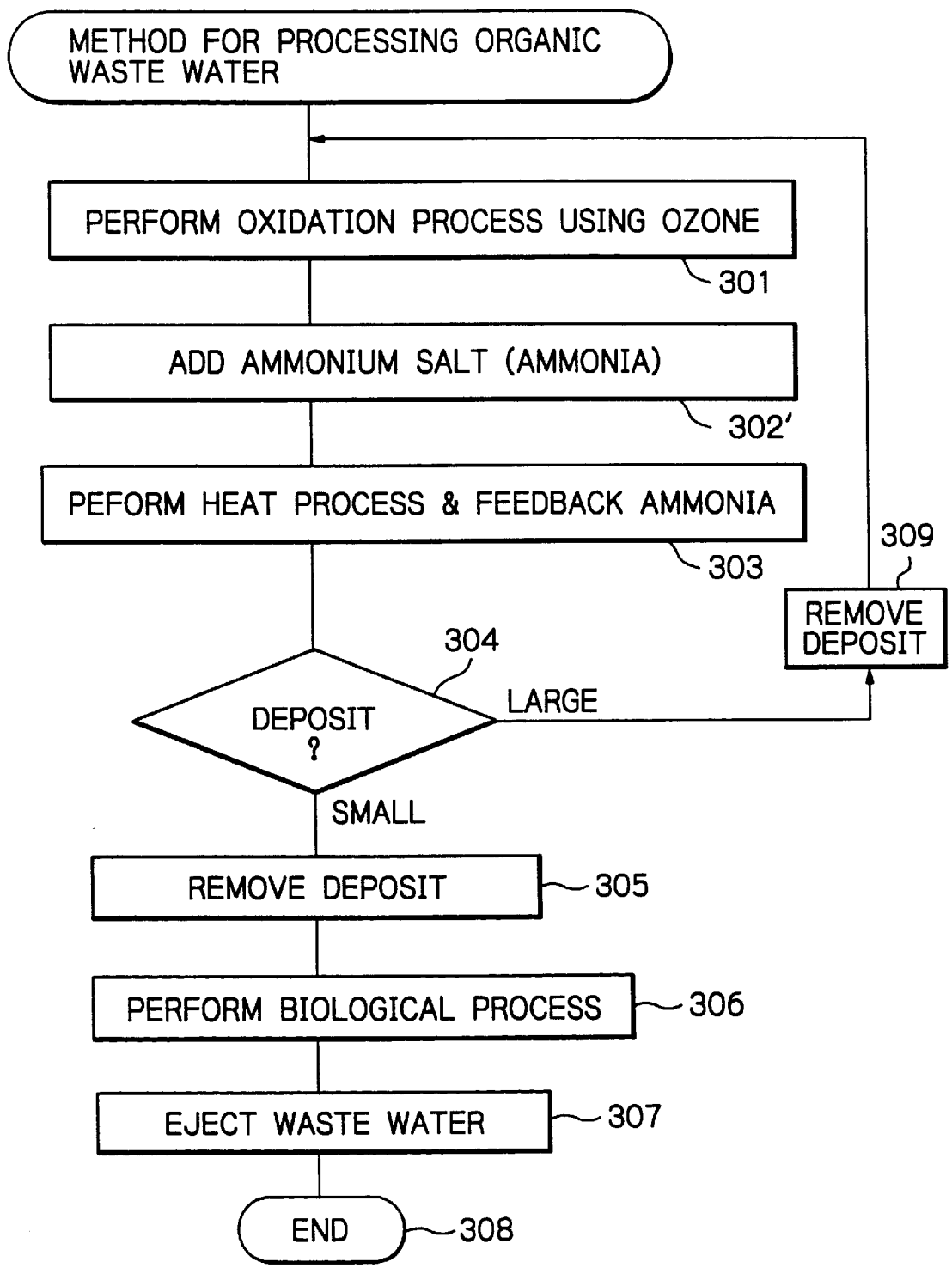
FIG. 7 is a flowchart for explaining a third embodiment of the method for processing organic waste water according to the present invention.

In FIG. 7, which illustrates a third embodiment of the method for processing organic waste water according to the present invention, step 302 of FIG. 3 is modified into step 302' which adds only ammonium salt or ammonia to the waste water. As a result, at step 302', although oxalic acid is chemically-changed by ammonium salt or ammonia into ammonium oxalate, ammonium oxalate is not chemically-changed by calcium salt into calcium oxalate. Therefore, calcium oxalate is not separated out.

Also, at step 303, the waste water is heated, so that unreacted oxalic acid is chemically-changed into oxalic amid which is separated out. Simultaneously, excess of ammonia included in the waste water is gasfied, and the excess of ammonia is fed back to the ammonium salt and calcium salt supplying step 302 to reuse it.

Further, at step 304, it is determined whether or not an amount of deposit formed by only oxalic amid is larger than a predetermined value.

Figure 8:
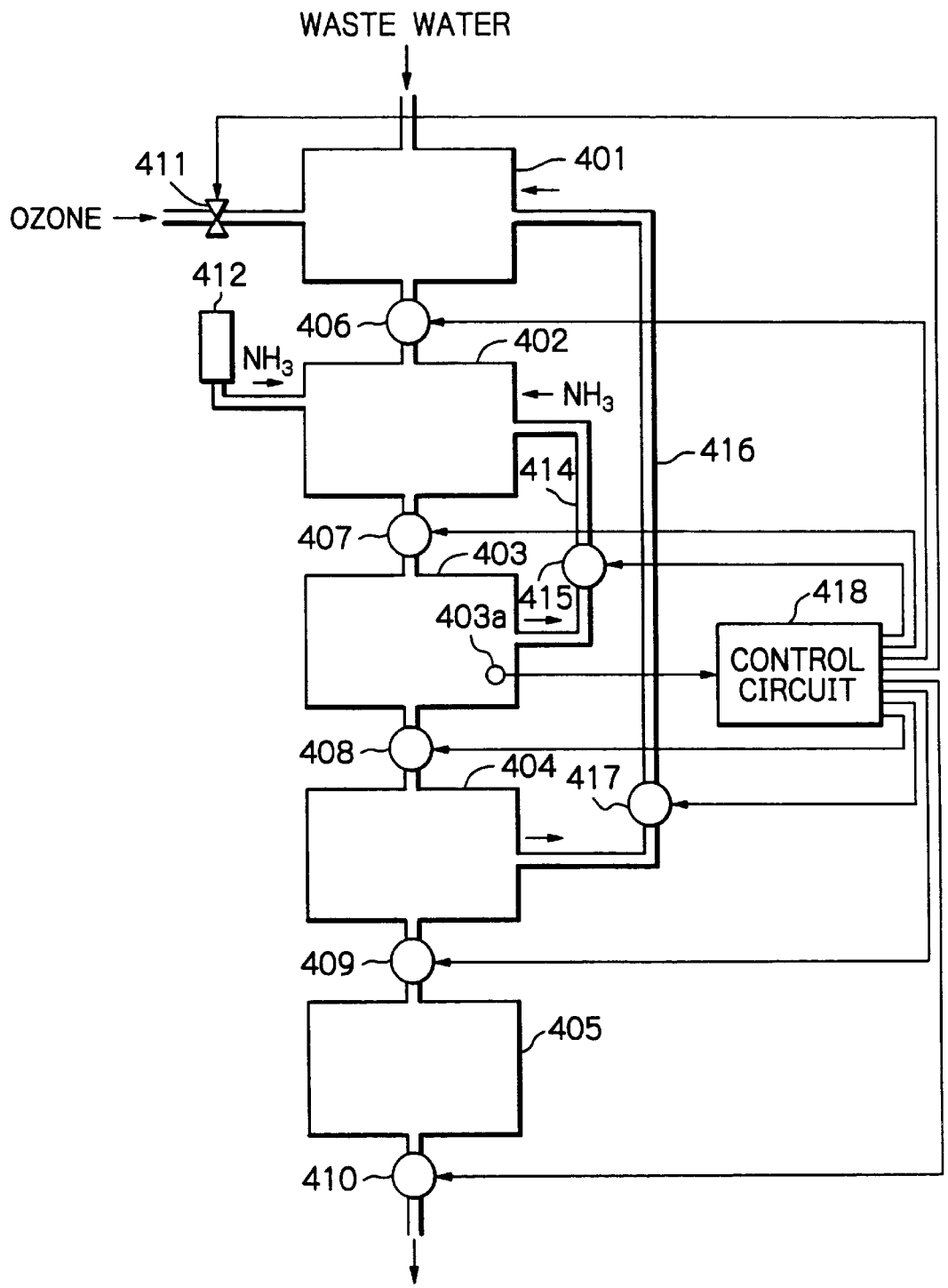
FIG. 8 is a diagram illustrating an organic waste water processing apparatus for carrying out the method as illustrated in FIG. 7.

In FIG. 8, which illustrates a waste water processing apparatus for carrying out the method as illustrated in FIG. 7, the elements are the same as those of FIG. 4 except that the calcium hydroxide source 413 of FIG. 4 is not provided.

Even in the third embodiment, since no ozone is required for processing oxalic acid, the amount of consumed ozone can be reduced.

As explained hereinabove, according to the present invention, the amount of consumed ozone can be reduced.

What is claimed is:

1. A method for processing a biologically hardly degradable waste water including benzene ring materials, comprising the steps of:

oxidizing said waste water using ozone to produce oxalic acid;

reacting said oxalic Acid using a chemical reaction to produce oxalate; and separating out said oxalate from said waste water.

2. The method as set forth in claim 1, wherein said oxalic acid reacting step comprises a step of adding one of ammonium salt and ammonia as well as calcium salt to said waste water, so that said oxalate is made of calcium oxalate.

3. The method as set forth in claim 1, further comprising a step of heating said waste water to a temperature higher than about 95° C. so that unreacted waste water is chemically-changed into oxalic amid, said oxalate being made of said oxalic amid as well as said calcium oxalate.

4. The method as set forth in claim 3, further comprising a step of feeding back ammonia produced in said heating step to said waste water as said one of ammonium salt and ammonia.

5. The method as set forth in claim 1, further comprising the steps of:

determining whether or not an amount of said oxalate is smaller than a predetermined value; and repeating operations of said oxidizing and chemical reacting steps, only when the amount of said oxalate is smaller than said predetermined value.

6. The method as set forth in claim 1, wherein said oxalic acid reacting step comprises a step of adding one of ammonium salt and ammonia to said waste water;

said method further comprising a step of heating said waste water to a temperature higher than about 95° C. so that said oxalate is made of said oxalic amid.

7. The method as set forth in claim 6, further comprising a step of feeding back ammonia produced in said heating step to said waste water as said one of ammonium salt and ammonia.

* * * * *